July 31, 1956

W. D. DRUMMOND 2,756,658

LATERALLY SHIFTABLE, TRACTOR MOUNTED PLOW

Filed Sept. 15, 1953

INVENTOR
WILLIAM D. DRUMMOND

ATTORNEY

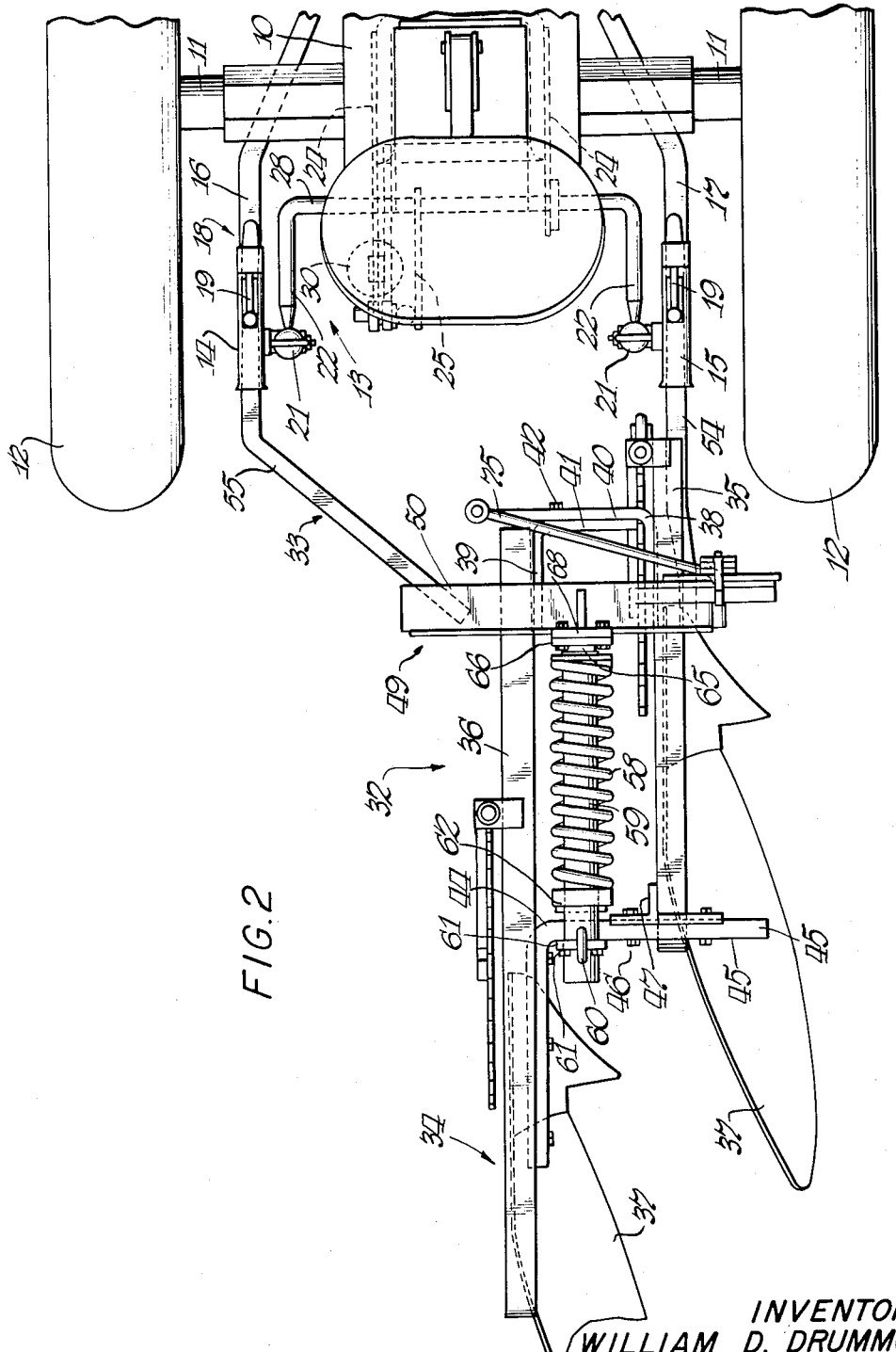

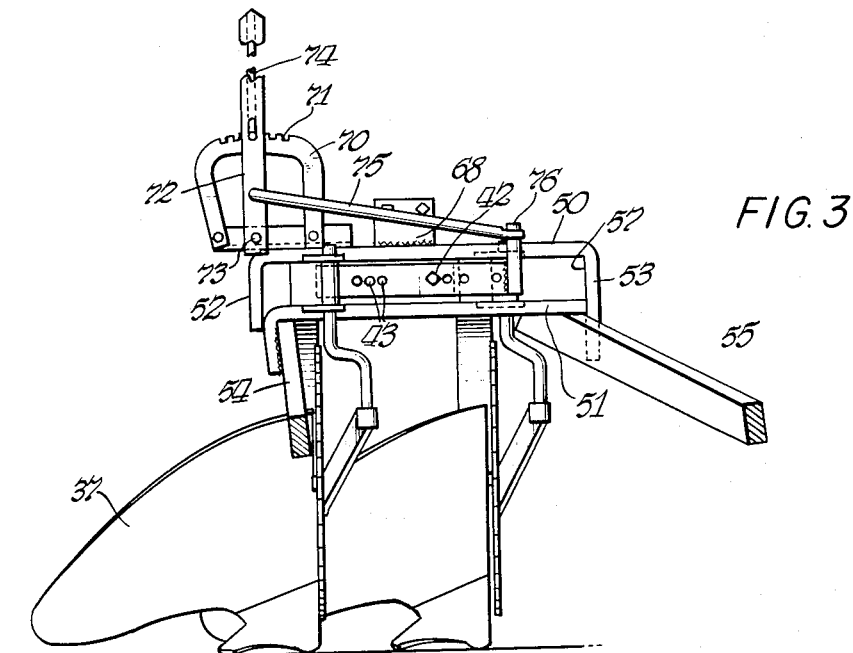
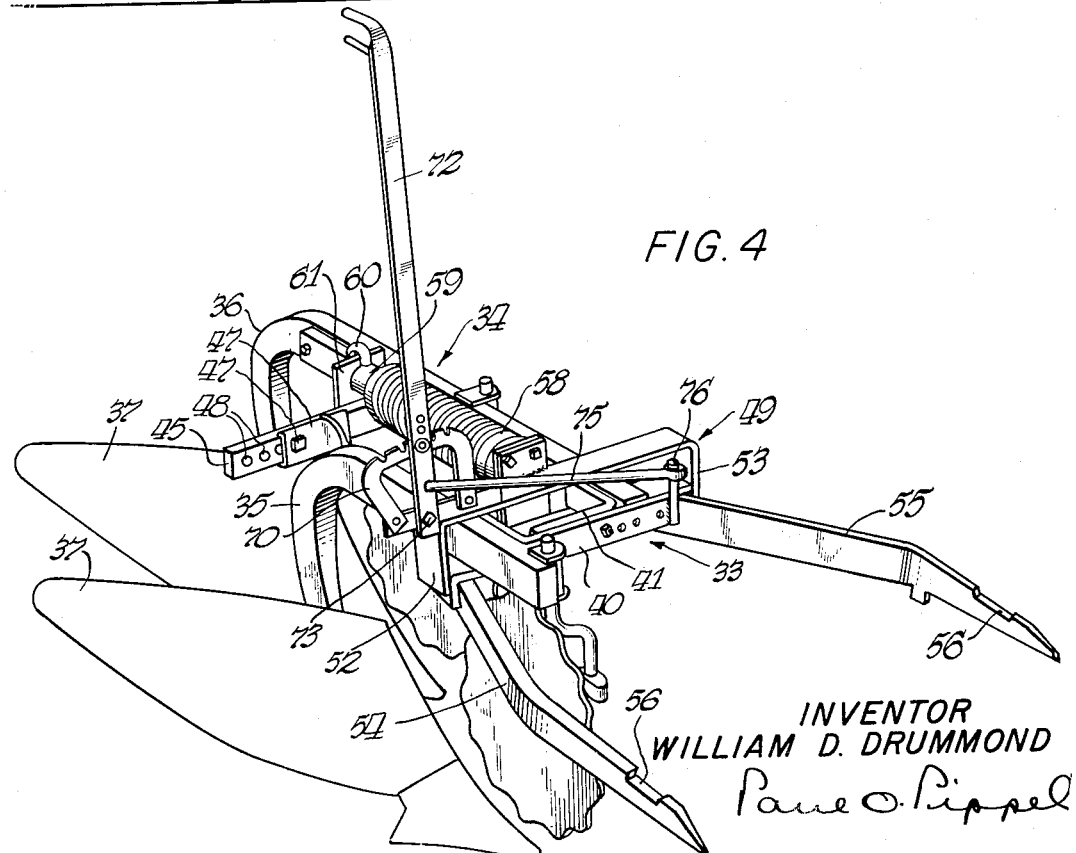

United States Patent Office 2,756,658
Patented July 31, 1956

2,756,658
LATERALLY SHIFTABLE, TRACTOR MOUNTED PLOW

William Duncan Drummond, Burlington, Ontario, Canada, assignor to International Harvester Company, a corporation of New Jersey Application September 15, 1953, Serial No. 380,263

3 Claims. (Cl. 97—47.53)

This invention relates to agricultural implements and particularly to plows. More specifically, the invention concerns a tractor mounted plow adapted to be propelled by and transported upon a tractor. An object of the invention is the provision of an improved implement and hitch construction adapted for connection to a tractor at laterally spaced locations to provide a stable implement, wherein simplified connecting means facilitate the quick attachment of the implement to and detachment thereof from the tractor.

Another object of the invention is the provision of a novel and improved unitary tool carrier and hitch construction adapted for direct connection to a tractor to form a unit therewith for raising and lowering the implement with respect to the ground.

A further object of the invention is the provision of an improved implement construction adapted for mounting upon a tractor and including a hitch frame and tool-carrying frame associated with the hitch frame in such a way as to accommodate both longitudinal movement and lateral swinging of the front end of the tool-carrying frame relative to the hitch frame.

Another object of the invention is the provision of an improved unitary tool support and hitch construction for an implement wherein the tool support is connected in draft-receiving relation to the hitch frame through the intermediary of cushioning means of sufficient strength to take the full draft load in normal operation but capable of yielding when abnormal draft forces are encountered, and wherein means are provided for adjusting the front end of the tool carrier laterally relative to its hitch frame in order to offset the effects of side draft on the plow.

Other objects and advantages of the invention will become clear from the following detailed description when read in conjunction with the accompanying drawings wherein:

Figure 2 is a plan view of the structure shown in Figure 1;

Figure 3 is a view in front elevation, and partly in section, of the implement of this invention; and Figure 4 is a view in perspective of the implement of this invention.

Figure 1:
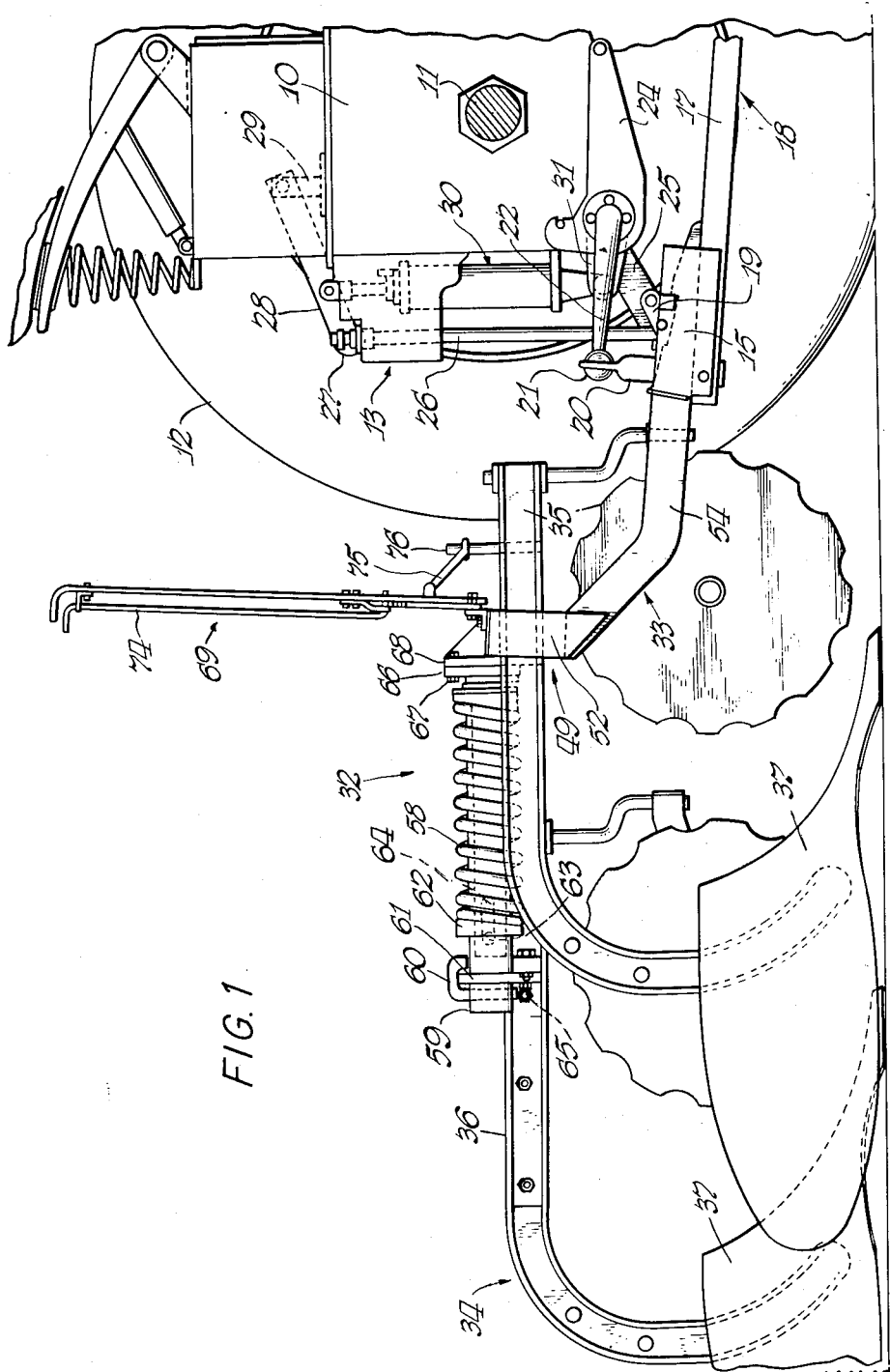
Figure 1 is a view in side elevation of the rear end of a tractor having incorporated therein a two-point implement attaching structure and having mounted thereupon an implement in the form of a two-bottom moldboard plow embodying the features of this invention.

Referring to the drawings, it will be observed that the numeral 10 designates the body of a tractor having a transverse rear axle 11, and laterally spaced rear drive wheels 12. The tractor has incorporated therewith an implement attaching structure, generally designated by the numeral 13, characterized by the provision of a pair of laterally spaced attaching elements in the form of sockets 14 and 15 provided at the ends of the rearwardly extending arms 16 and 17, respectively, of a yoke 18, only part of which is shown, but which, it may be understood, is centrally connected in draft-receiving relation to the tractor body at a location in advance of the rear axle 11. A further description of the constructional details of the two-point attaching structure 13 may be found in copending U. S. application Serial No. 338,651 filed February 25, 1953.

Briefly, however, it should be noted that the attaching elements 14 and 15 are elongated sockets having latching mechanism 19 incorporated therein to serve a purpose that will hereinafter become clear. The rear end of each of the arms 16 and 17 is connected by a vertically extending link 20 through the intermediary of a ball and socket joint 21, with an arm 22 extending rearwardly from each end of a transverse rock shaft 23, mounted in bearings provided in spaced brackets 24, affixed to the body of the tractor. Rocking of the shaft 23, therefore, acting through links 20, vertically moves the yoke-shaped drawbar 18 between positions corresponding to operating and transport positions of an attached implement. Rocking of the shaft 23 is effected by the provision of a rock arm 25 affixed to the shaft 23 and pivotally connected to the lower end of a vertically extending lift rod 26, the upper end of which is slidingly received in a swivel 27 affixed to the rear end of a link 28 pivoted at its other end upon a lug 29 secured to the tractor body. A ram unit 30, suitably connected to and receiving fluid under pressure from a source, not shown, on the tractor, is mounted at its lower end upon an arm 31 affixed to one of the brackets 24, and is connected at its upper end to the link 28. Extension of the ram 30 thus raises the link 28 to rock the arm 25 and shaft 23 and vertically move the drawbar 18 with respect to the tractor.

The implement with which the present invention is concerned, and which is connected to the tractor by means of the two-point attaching structure 13, is in the form of a two-bottom moldboard plow, generally designated by the numeral 32, and includes two relatively movable portions, one of which is a hitch frame, designated at 33, and the other portion is a tool frame 34.

The tool frame 34 comprises laterally spaced longitudinally extending tool-carrying beams 35 and 36, the latter being offset rearwardly from the beam 35. Each of the beams is curved downwardly and forwardly at its rear end and has mounted thereupon a plow bottom 37. The beams 35 and 36 are connected and adjustably spaced by a pair of angle bars 38 and 39 affixed to the tool bars and having overlapping transverse portions 40 and 41, respectively, connected by one or more bolts 42. The transverse portions 40 and 41 are provided with a plurality of apertures 43 for the reception of the bolt 42, whereby the spacing between the forward ends of the beams 35 and 36 may be adjusted. An angle bar 44 affixed to the rear portion of tool beam 36 is provided with a transverse portion 45, adjustably affixed by bolts 46 to a bracket 47 secured to the rear portion of tool beam 35. The transverse portion 45 of the angle bar 44 is also provided with a plurality of openings 48 to receive the bolts 46, whereby adjustment of the spacing between the rear ends of beams 35 and 36 may be made.

The forward ends of the tool bars 35 and 36 are slidably receivable for both relative longitudinal and lateral sliding movement in the socket portion 49 of the hitch frame 33. This portion of the hitch frame extends transversely of the direction of travel of the implement and comprises upper and lower transverse bars 50 and 51, the upper bar 50 having its ends bent downwardly to form laterally spaced sides 52 and 53, the former being welded to one end of the lower bar 51, which in turn is welded to the rear end of a forwardly projecting shaft member 54. The side 53 is welded to the rear end of a forwardly projecting shaft member 55, laterally spaced from the shaft 54. The forward ends of the shafts 54 and 55 are shaped for easy sliding reception in the elongated sockets 14 and 15 of the tractor attaching structure 14 providing a rigid and stable connection to the tractor. Grooves 56 in the forward ends of the shafts 54 and 55 cooperate with the latches 19 to lock the implement to the tractor in a manner set forth more fully in the co-pending U. S. application referred to above. The hitch frame 33 is thus a rigid structure having lateral stability by virtue of the reception of the shafts 54 and 55 in the sockets 14 annd 15, and has longitudinal stability by virtue of the length of the sockets 14 and 15 and the reception of the shafts therein.

The bars 50 and 51 and the sides 52 and 53 of the socket member 49 form a rectangular transverse slot, designated at 57 in which the forward ends of beams 35 and 36 are receivable for longitudinal and lateral sliding movement.

Longitudinal movement of the tool frame 34 relative to the hitch frame 33 is resisted by a cushioning spring 58 surrounding a tube 59 having a spring seat at its forward end and anchored at its rear end by means of a hook 60 to a bracket 61 affixed to the transverse portion 45 of the angle bar 44, forming a part of the tool supporting frame. The rear end of the spring 58 abuts a collar 62, engaging a pin 63 received in an elongated slot 64 (see Figure 1) provided in the tube 59 and carried by a solid bar 65, telescoping within the tube 59 and having its forward end affixed to a plate 66, secured by two or more bolts 67 to another plate 68 welded to the socket portion 49 of the hitch frame 33. Rearward movement of the tool-carrying frame with respect to the hitch frame in the confines of the slot 57 of the socket member 49 compresses the spring 58 and is thus resisted. Spring 58 is sufficiently strong that under normal operating conditions of the plow, substantially no relative movement between the tool frame and the hitch frame occurs. However, under abnormal draft load, the tool-carrying frame will slide rearwardly in the socket 49 of the hitch frame and cushion the shock to which the plow is subjected, protecting it against injury. It should also be noted that by virtue of the close confinement of the forward end of the tool-supporting frame by the bars 50 and 51 of the socket 49, and the fact that these bars confine the tool frame at laterally spaced locations, the tool frame is stabilized relative to the hitch frame and to the tractor against lateral tilting about a longitudinal axis.

The slot formed by the socket portion of the hitch frame is sufficiently long to accommodate adjustment of the spacing between the tool bars 35 and 36 to widen the cut of the plow bottoms or accommodate larger earthworking tools, and also to accommodate lateral movement of the front end of the tool frame within the confines of the socket portion 49, in order to adjust the line of draft of the implement with respect to the tractor; for example, to compensate for the effects of side draft on the plow. This adjustment is accommodated by a loose connection between tube 59 and bracket or plate 61, the opening in the latter being sufficiently large to accommodate angular movement of the tube about the bracket 61 as a pivot. Adjustment is accomplished by adjusting mechanism, designated at 69, which includes a quadrant 70 having notches 71 therein and affixed to the upper bar 50 of the hitch frame 33. An adjusting lever 72 is pivoted at 73 upon the quadrant and is provided with detent mechanism 74 receivable in a selected one of the notches 71 upon movement of the lever over the quadrant.

The lever 72 has pivotally connected thereto one end of a rod 75, the other end of which is pivotally mounted upon the upper end of a peg 76, the lower end of which is welded to the end of the transverse portion 40 of the angle bar 38, forming a part of the tool-carrying frame.

Movement of the lever 72 over the quadrant 70 thus effects lateral angling of the front end of the tool-carrying frame relative to the hitch frame and to the tractor about the bracket plate 61 as a pivot, and this shifting is accommodated by the spring 58 so that cushioning of the tool frame occurs in any position of lateral adjustment thereof.

From the foregoing it should be clear that an improved implement and hitch construction has been devised particularly adapted for mounting upon a tractor to be supported thereby in transport. It should also be understood, however, that the invention has been described in its preferred embodiment only, and that modifications may be made therein without departing from the spirit thereof or the scope of the appended claims.

What is claimed is:

1. An agricultural implement adapted for mounting upon a tractor comprising a hitch frame forming a part of the implement independently of the tractor having laterally spaced attaching elements for connection to laterally spaced complementary attaching elements on the tractor to provide for stabilizing the hitch frame against lateral tilting about a longitudinal axis, said hitch frame having a transversely extending socket portion, a tool-supporting frame substantially rigid with said hitch frame in normal operation of the implement having laterally spaced portions thereof received and confined in said socket portion to stabilize the tool frame against lateral tilting relative to the hitch frame about a longitudinal axis, said tool frame being laterally and longitudinally slidable in said socket portion, a spring extending longitudinally of the implement anchored at one end to the hitch frame and at its other end to the tool frame and forming a draft connection therebetween, a rockable lever mounted on the hitch frame and a link connecting the lever to the tool frame for laterally adjusting the latter in said socket portion.

2. An agricultural implement adapted for mounting upon a tractor comprising a hitch frame forming a part of the implement independently of the tractor having laterally spaced attaching elements for connection to laterally spaced complementary attaching elements on the tractor to provide for stabilizing the hitch frame against lateral tilting about a longitudinal axis, said hitch frame having a transversely extending socket portion, a tool-supporting frame substantially rigid with said hitch frame in normal operation of the implement having laterally spaced portions thereof received and confined in said socket portion to stabilize the tool frame against lateral tilting relative to the hitch frame about a longitudinal axis, said tool frame being laterally and longitudinally slidable in said socket portion, a spring extending longitudinally of the implement anchored at one end to the hitch frame and at its other end to the tool frame and forming a draft connection therebetween, said spring being of sufficient strength to transmit draft to the tool frame in normal operation of the implement and to yield when abnormal draft forces are encountered, a rockable member mounted on the hitch frame and a link connecting the lever to the tool frame for laterally adjusting the latter in said socket portion, the spring being effective in any position of lateral adjustment of the tool frame to transmit draft from the hitch frame thereto.

3. An agricultural implement adapted for mounting upon a tractor having laterally spaced attaching sockets vertically movable between positions corresponding to the operating and transport positions of the implement, comprising a rigid hitch frame independent of the tractor and forming a part of the implement, laterally spaced shaft members forming a part of said hitch frame slidably receivable in said sockets upon approach of the tractor thereto to form a rigid connection accommodating vertical movement of the hitch frame therewith, a tool-supporting frame forming a part of the implement independently of the tractor and attachable with the hitch frame as a unit to the sockets on the tractor for vertical movement therewith between operating and transport positions, said hitch frame having means serving as a transverse slot therein to slidably receive the forward end of the tool frame for lateral and longitudinal movement in the slot, a spring forming a draft connection between the hitch frame and the tool frame to yieldably resist longitudinal movement therebetween, an adjusting lever pivotally mounted on the hitch frame, and a link connecting the lever to the tool frame and accommodating said longitudinal movement for selectively laterally adjusting the position of the tool frame in said slot.

References Cited in the file of this patent

UNITED STATES PATENTS

| | | |
|---|---|---|
| 642,349 | Martin | Jan. 30, 1900 |
| 860,763 | Olsen | July 23, 1909 |
| 1,291,177 | Saunderson | Jan. 14, 1919 |
| 1,441,773 | Witter | Jan. 9, 1923 |
| 1,450,759 | Snyder | Apr. 3, 1923 |
| 1,464,740 | Benjamin et al. | Aug. 14, 1923 |
| 1,939,950 | Brown | Dec. 19, 1933 |
| 2,341,179 | Hipple | Feb. 8, 1944 |
| 2,608,145 | Knapp | Aug. 26, 1952 |
| 2,620,715 | Silver et al. | Dec. 9, 1952 |
| 2,659,288 | Vanderloop | Nov. 17, 1953 |
| 2,701,510 | Altgelt | Feb. 8, 1955 |
| 2,702,501 | Simpson | Feb. 22, 1955 |